(12) United States Patent
Kim et al.

(10) Patent No.: US 12,554,643 B2
(45) Date of Patent: Feb. 17, 2026

(54) ELECTRONIC DEVICE, AUTOMOTIVE DEVICE, AND DATA CENTER

(71) Applicant: SAMSUNG ELECTRONICS CO., LTD., Suwon-si (KR)

(72) Inventors: Byoung Sul Kim, Suwon-si (KR); Kwang Won Park, Suwon-si (KR); Joon Min Park, Seoul (KR); Hyeon Soo Sim, Uijeongbu-si (KR); Hee Jun Lee, Hwaseong-si (KR); Sung Tack Hong, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 17/388,072

(22) Filed: Jul. 29, 2021

(65) Prior Publication Data

US 2022/0129383 A1 Apr. 28, 2022

(30) Foreign Application Priority Data

Oct. 27, 2020 (KR) .................... 10-2020-0140208

(51) Int. Cl.
*G06F 12/0806* (2016.01)
*G06F 11/10* (2006.01)
*G06F 11/30* (2006.01)

(52) U.S. Cl.
CPC ...... *G06F 12/0806* (2013.01); *G06F 2212/62* (2013.01)

(58) Field of Classification Search
CPC ............. G06F 11/1004; G06F 11/3024; G06F 11/3058; G06F 12/0806; G06F 2212/62

USPC .................................... 711/119, 103
See application file for complete search history.

(56) References Cited

U.S. PATENT DOCUMENTS

| 6,493,800 | B1 | 12/2002 | Blumrich |
| 8,219,885 | B2 | 7/2012 | Bradley et al. |
| 8,489,815 | B2 | 7/2013 | Iyigun et al. |
| 9,965,350 | B2 | 5/2018 | Craddock et al. |
| 10,649,684 | B2* | 5/2020 | Blake ............... G06F 9/542 |
| 2006/0280019 | A1 | 12/2006 | Burton et al. |
| 2009/0070651 | A1* | 3/2009 | Diggs ............... G06F 11/1068 714/752 |

(Continued)

FOREIGN PATENT DOCUMENTS

JP H05108501 4/1993
KR 101475931 12/2014

OTHER PUBLICATIONS

Search Report Dated Jan. 18, 2022 in the Corresponding Appln. No. EP 21 186 882.3.

(Continued)

*Primary Examiner* — Hashem Farrokh
(74) *Attorney, Agent, or Firm* — MORGAN, LEWIS & BOCKIUS LLP

(57) ABSTRACT

An electronic device includes a processor configured to control a system, a main memory including a first region configured to store normal data according to a normal operation and a second region configured to store monitoring data, a first cache configured to be activated in response to a monitoring enable signal of the processor and to access the second region, and a second cache configured to load the normal data according to the normal operation of the processor.

20 Claims, 10 Drawing Sheets

(56) References Cited

U.S. PATENT DOCUMENTS

| | | | | |
|---|---|---|---|---|
| 2009/0228870 A1* | 9/2009 | Kao | ............... | G06F 21/556 |
| | | | | 717/127 |
| 2012/0066551 A1 | 3/2012 | Palus et al. | | |
| 2014/0303769 A1* | 10/2014 | Koyama | ............ | G06F 11/3003 |
| | | | | 700/121 |
| 2015/0220393 A1 | 8/2015 | Broderick et al. | | |
| 2021/0200547 A1* | 7/2021 | Yasin | ............ | G06F 12/0811 |

OTHER PUBLICATIONS

1st Office Action Dated Jan. 28, 2022 in the Corresponding Appln. No. EP 21 186 882.3.

* cited by examiner ically described herein, should typically be considered as available for other similar features or aspects in other embodiments of the inventive concept.

ELECTRONIC DEVICE, AUTOMOTIVE DEVICE, AND DATA CENTER

CROSS-REFERENCE TO RELATED APPLICATION

This application claims priority under 35 U.S.C. § 119 to Korean Patent Application No. 10-2020-0140208, filed on Oct. 27, 2020 in the Korean Intellectual Property Office, the disclosure of which is incorporated by reference herein in its entirety.

TECHNICAL FIELD

Embodiments of the inventive concept relate to an electronic device, an automotive device, and a data center.

DISCUSSION OF RELATED ART

A cache is present between a processor and a main memory and is used for increasing data throughput of the main memory. When data corruption occurs while accessing the main memory, the processor operates based on the corrupted data, which may cause a system halt or a malfunction. The system halt or the malfunction may cause hard defects that occur in a general environment, progressive defects caused by a change in system operating conditions during system operation or a change in external environment, or defects caused by an unpredictable situation such as power fluctuation or signal noise.

Recently, as system configurations and operations are becoming more complicated, performance requirements are increasing, and processes for each device are further subdivided, it is increasingly difficult to grasp or identify types or causes of defects.

SUMMARY

According to an embodiment of the inventive concept, an electronic device includes a processor configured to control a system, a main memory including a first region configured to store normal data according to a normal operation and a second region configured to store monitoring data, a first cache configured to be activated in response to a monitoring enable signal of the processor and to access the second region, and a second cache configured to load the normal data according to the normal operation of the processor.

According to an embodiment of the inventive concept, an automotive device includes a register configured to store system initial setup information and system environment information, a processor configured to perform system control and arithmetic operations on the basis of the system initial setup information and the system environment information, a main memory including a first region configured to store normal data based on the arithmetic operations of the processor and a second region configured to store preset monitoring data, a first cache configured to access the main memory and perform an operation to access the monitoring data, and a second cache configured to access the main memory and perform an operation to access the normal data. The automotive device verifies cyclic redundancy check (CRC) code for the monitoring data to monitor a system environment.

According to an embodiment of the inventive concept, a data center includes a storage server, where the storage server includes a register configured to store system initial setup information and system environment information, a processor configured to control an operation of the storage server on the basis of the system initial setup information and the system environment information, a main memory including a first region configured to store normal data based on arithmetic operations of the processor and a second region configured to store preset monitoring data, and a monitoring cache configured to access the main memory and perform an operation for accessing the monitoring data.

According to an embodiment of the inventive concept, a method of operating an electronic device includes reading, by a processor, system initial setup information from a register when a system starts, where the system initial setup information includes an activation condition, activating, by the processor, a monitoring cache according to the activation condition, setting the monitoring cache to a monitoring region of a main memory, loading monitoring data from the monitoring cache to the monitoring region, generating cyclic redundancy check (CRC) code for the monitoring data, comparing the generated CRC code with a verification value to generate a CRC code verification result, checking the CRC code verification result, and adjusting system environment information based on the CRC code verification result.

BRIEF DESCRIPTION OF THE DRAWINGS

The above and other aspects and features of the inventive concept will become more apparent by describing in detail exemplary embodiments thereof with reference to the attached drawings.

DETAILED DESCRIPTION OF THE EMBODIMENTS

Figure 1:
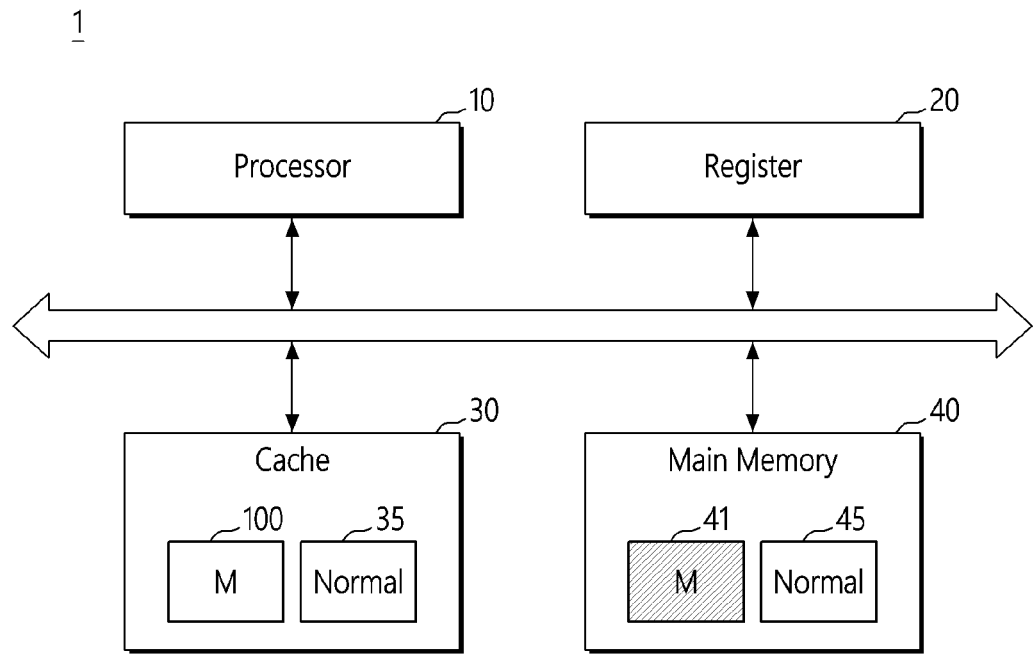
FIG. 1 is a diagram illustrating an electronic device according to an embodiment of the inventive concept.

Embodiments of the inventive concept provide an electronic device capable of operating under a stable condition by predicting the occurrence of a system defect in advance and adjusting a system environmental condition.

Embodiments of the inventive concept also provide an automotive device capable of operating under a stable condition by predicting the occurrence of a system defect in advance and adjusting a system environmental condition.

Embodiments of the inventive concept further provide a data center capable of operating under a stable condition by predicting the occurrence of a system defect in advance and adjusting a system environmental condition.

Hereinafter, embodiments of the inventive concept will be described with reference to the accompanying drawings. Like reference numerals may refer to like elements throughout this application.

FIG. 1 is a diagram illustrating an electronic device according to an embodiment of the inventive concept.

An electronic device 1 may include a processor 10, a register 20, a cache 30, and a main memory 40.

The electronic device 1 may be a personal computer (PC), a laptop computer, a server, a data center, a media player, or an automotive device such as a navigation system. Alternatively, the electronic device 1 may be a mobile system, such as a mobile phone, a smartphone, a tablet PC, a wearable device, a healthcare device, or an Internet of things (IoT) device.

The processor 10 controls the overall operation of a system of the electronic device 1 and performs arithmetic operations.

The register 20 may store data or instructions for the arithmetic operations of the processor 10. The register 20 may be used to store values being calculated by the processor 10. In embodiments of the inventive concept, the register 20 may be implemented as a general-purpose register, a special register, an instruction register, an index register, a constant register, a floating-point register, an address register, a data register, or the like.

In embodiments of the inventive concept, the register 20 may store system initial setup information (basic input/output system (BIOS) information) and system environment information (system information).

When the system starts, the system initial setup information may be loaded into each component included in the electronic device 1 so that initial states of each component may be set. For example, the system initial setup information may be driven by firmware such as BIOS so that the components of the system may be set. In embodiments of the inventive concept, the system initial setup information may include booting information of an operating system and setting information of various types of hardware of the electronic device 1.

The system environment information may include information related to an operation state of each component included in the electronic device 1 during system operation. In embodiments of the inventive concept, the system environment information may include a temperature state, an operating frequency, an operating voltage, a fan operation, an alternating current (AC) parameter, a column to column delay time (tCCD), or the like of the processor 10 or the main memory 40.

The cache 30 may store instructions or data. In embodiments of the inventive concept, the cache 30 may be implemented as a static random-access memory (SRAM). In embodiments of the inventive concept, the cache 30 may include a normal cache 35 and a monitoring cache 100. The monitoring cache 100 may be referred to as a first cache, and the normal cache 35 may be referred to as a second cache.

The normal cache 35 may be a high-speed buffer for compensating for a difference in speed between the processor 10 operating at a relatively high speed and the main memory 40 operating at a relatively low speed, with respect to normal data according to a general operation of the processor 10. For example, the data (e.g., normal data) stored in the main memory 40 may be loaded into the normal cache 35 in units of blocks and the loaded data may be transmitted to the processor 10 in units of words.

The monitoring cache 100 may be a storage region for monitoring data according to a monitoring operation of the processor 10. In an embodiment of the inventive concept, the monitoring data may be stored in the monitoring cache 100 and then loaded into a monitoring region of the main memory 40 on the basis of the system initial setup information. The monitoring data is known preset data and, in embodiments of the inventive concept, may be a known data pattern that is set such that a cell margin and input and output margin in which characteristics of the main memory 40 are reflected are weak, e.g., less than a predetermined threshold. For example, the monitoring data may be data having a high probability of occurrence of defects compared to normal data, such as simultaneous switching noise (SSN) or a combination of 0xA5A5, 0x5A5A, 0x0101, and 0xfefe.

In an embodiment of the inventive concept, the monitoring cache 100 may be a cache implemented in hardware separate from the normal cache 35 and, in an embodiment of the inventive concept, may be a partial region of the cache that is split from one cache on the basis of the system initial setup information.

The monitoring cache 100 may be activated based on the system initial setup information, may be activated based on an activation condition, or may be periodically activated (e.g., according to a preset period). The system initial setup information may include, for example, information about the activation condition of the monitoring cache 100. In embodiments of the inventive concept, the activation condition may include a condition for at least one of a temperature of the processor 10 or the main memory 40, input and output bandwidths for the main memory 40, the number of bank operations in the main memory 40, or a running time of the system. For example, after the electronic device 1 is initially set according to the system initial setup information, when the temperature of the processor 10 is out of a preset temperature range, when the input and output bandwidths are out of a reference bandwidth range, or when the number of bank operations exceeds a predetermined number, the monitoring cache 100 may be activated.

In an embodiment of the inventive concept, the monitoring cache 100 may be activated in response to a monitoring enable signal transmitted by the processor 10. When the system starts, the monitoring enable signal may be periodically enabled according to a BIOS setting or may be enabled under the activation condition. The register 20 may store the activation condition of the monitoring enable signal. When the system starts, the processor 10 may load the activation condition from the register 20 to set the system.

In embodiments of the inventive concept, the electronic device 1 may generate cyclic redundancy check (CRC) code for the monitoring data and verify the generated CRC code by comparing the generated CRC code with a pre-stored verification value. According to a result of the verification, the electronic device 1 may monitor a system operation environment and, if necessary, adjust the system environment information. The processor 10 may update the adjusted system environment information in the register 20.

In embodiments of the inventive concept, the system environment information may include an AC parameter, an operating voltage, a frequency of an operating clock, or a bank operation policy as a memory operating condition. For example, the AC parameter may be adjusted, the operating voltage may be increased or decreased, or the frequency of the operating clock may be decreased, according to the verification result of the CRC code so that system performance is lowered.

In embodiments of the inventive concept, the generation of the CRC code and checking of the verification result may be performed in the monitoring cache 100. Alternatively, in embodiments of the inventive concept, the generation of the CRC code and the checking of the verification result may be performed in a CRC module. In an embodiment of the inventive concept, the CRC module may be implemented separately from the processor 10, the cache 30, and the main memory 40 and, in an embodiment of the inventive concept, may be implemented in an error correction code (ECC) engine included in the electronic device 1.

The main memory 40 is a main memory for the processor 10, and may include a double data rate (DDR) synchronous dynamic random-access memory (SDRAM), a high bandwidth memory (HBM), a hybrid memory cube (HMC), a dual in-line memory module (DIMM), an Optane™ DIMM, or a non-volatile DIMM (NVDIMM). The main memory 40 may include a volatile memory such as a SRAM and/or a DRAM, and may include a non-volatile memory (NVM) such as a flash memory, a phase-change RAM (PRAM), and/or a resistive RAM (RRAM). The main memory 40 may be implemented in one package together with the processor 10.

The main memory 40 may include a monitoring region 41, and a normal region 45 for normal data, which is a region excluding the monitoring region 41. The normal region 45 may be referred to as a first region, and the monitoring region 41 may be referred to as a second region.

The monitoring region 41 may be a dedicated region for system monitoring, to which the monitoring data loaded from the monitoring cache 100 is written and the monitoring data stored therein is read. The normal region 45 may be a main memory of the electronic device 1. In other words, the monitoring region 41 may be a memory region in which the data is accessed by the monitoring cache 100 and, the normal region 45 may be a memory region in which the data is accessed by the normal cache 35.

In embodiments of the inventive concept, the main memory 40 may allocate addresses to the monitoring region 41 and the normal region 45 on the basis of the system initial setup information. For example, the system initial setup information may include preset address allocation information about the monitoring region 41. For example, the present address allocation information may include information for dividing the main memory 40 into the monitoring region 41 and the normal region 45.

Figure 2:
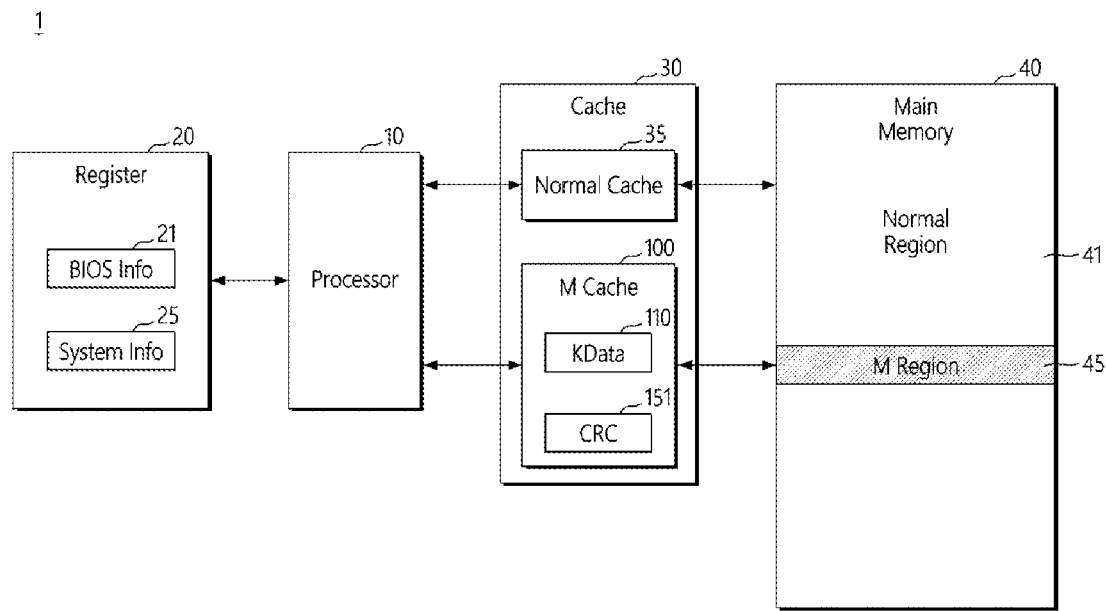
FIG. 2 is a diagram illustrating an electronic device according to an embodiment of the inventive concept.
Figure 3:
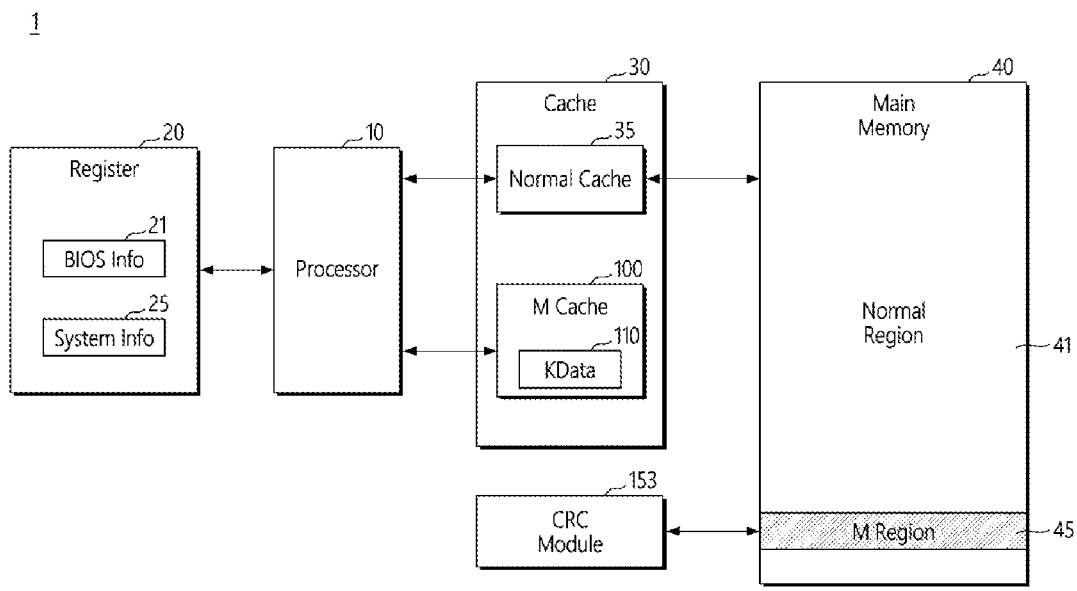
FIG. 3 is a diagram illustrating an electronic device according to an embodiment of the inventive concept.
Figure 4:
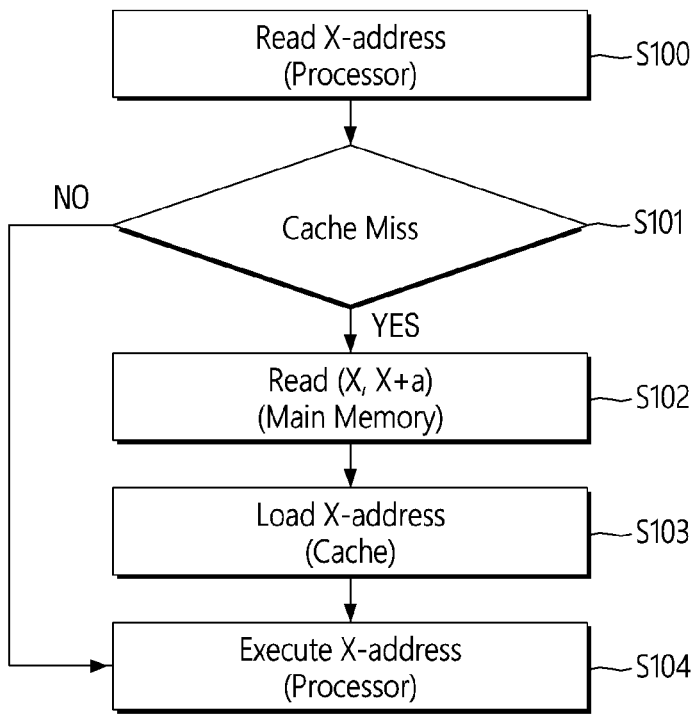
FIG. 4 is a flowchart for describing a cache read operation according to an embodiment of the inventive concept.

Hereinafter, electronic devices according to embodiments of the inventive concept are illustrated in FIGS. 2 to 4. For convenience of description, descriptions identical to that of FIG. 1 will be omitted.

FIG. 2 is a diagram illustrating an electronic device according to an embodiment of the inventive concept.

The electronic device 1 may include the processor 10, the register 20, the cache 30, and the main memory 40.

In embodiments of the inventive concept, in the electronic device 1, when the system starts, the main memory 40 may be divided into the monitoring region 41 and the normal region 45 so that addresses may be allocated to the monitoring region 41 and the normal region 45 according to system initial setup information 21, and the cache 30 may be divided into the normal cache 35 and the monitoring cache 100. Further, an activation condition of the monitoring cache 100 may be system-set.

The processor 10 may activate the monitoring cache 100 according to the activation condition to monitor system operation.

In embodiments of the inventive concept, the monitoring cache 100 may include an NVM region 110 in which preset monitoring data is stored and a CRC module 151.

When the monitoring cache 100 is activated according to the activation condition, the monitoring cache 100 may write the monitoring data stored in the NVM region 110 to the monitoring region 41 of the main memory 40, or read the monitoring data stored in the monitoring region 41 to load the written or read monitoring data to a region other than the NVM region 110. The CRC module 151 may generate CRC code for the read or written monitoring data and compare the generated CRC code with a pre-stored verification value. The CRC module 151 may transmit a verification result to the processor 10.

The processor 10 may adjust system environment information 25 on the basis of the verification result. In embodiments of the inventive concept, the processor 10 may adjust only at least one piece of operation information, and, in embodiments of the inventive concept, may update the system environment information 25, which is stored in the register 20 as register bits.

FIG. 3 is a diagram illustrating an electronic device according to an embodiment of the inventive concept. Descriptions identical to that of FIG. 2 will be omitted.

Unlike the embodiment of FIG. 2, the electronic device 1 may include a CRC module 153 implemented separately from the monitoring cache 100. In this case, the CRC module 153 may generate and verify CRC code for monitoring data, or may generate and verify CRC code for normal data.

Figure 5:
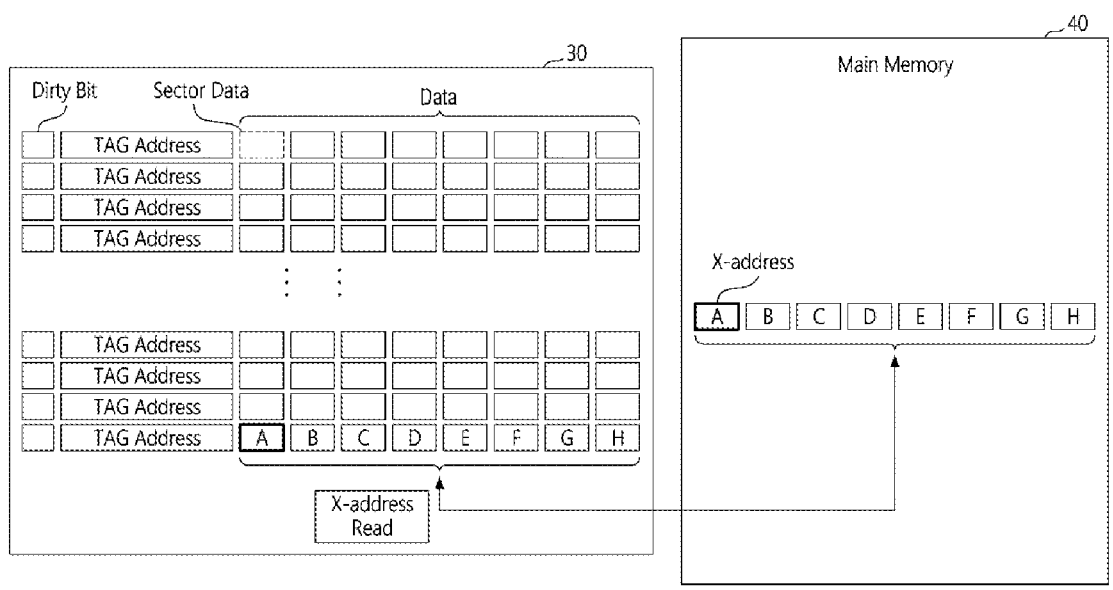
FIG. 5 is a conceptual diagram for describing the cache read operation of FIG. 4 according to an embodiment of the inventive concept.

FIG. 4 is a flowchart for describing a cache read operation according to an embodiment of the inventive concept. FIG. 5 is a conceptual diagram for describing the cache read operation of FIG. 4 according to an embodiment of the inventive concept.

Because of locality caused by a difference in operation speed between the processor 10 and the main memory 40, the cache 30 does not only load data of a target address from the main memory 40 but also loads pieces of data of addresses adjacent to the target address.

Referring to FIGS. 4 and 5, for the processor 10 to access data of a target address (X-address) (S100), the processor 10 first determines whether the corresponding data is present in the cache 30 (S101). When it is determined that the corresponding data is not present in the cache 30, the cache 30 accesses the target address (X-address) of the main memory 40 and addresses adjacent to the target address to read the corresponding data and pieces of data adjacent thereto (S102).

When data of the target address (X-address) is assumed to be data A, the cache 30 reads not only the data A from the main memory 40 but also pieces of data B, C, D, E, F, G, and H stored at addresses adjacent to the target address so that the pieces of data A to H are loaded into the cache 30 (S103). In other words, the pieces of data of the addresses adjacent to the target address are loaded into the cache 30 in units of lines, e.g., in units of blocks, of a memory cell. When the data is loaded into the cache 30 (S103) or when there is not a cache miss (S101: NO), the processor 10 executes or performs an operation on the data of the target address (S104).

The monitoring cache 100 is also operated according to the locality of the cache 30. When monitoring data is read or written between the monitoring cache 100 and the monitoring region 41 of the main memory 40 according to the locality of the cache, the electronic device 1 is more likely to detect an unstable situation in the system during such an access process.

The monitoring data is data which is set as a data pattern with a high possibility of causing defects and is pre-stored. Therefore, when CRC code is verified by line filling the monitoring data into the cache according to the locality, it is possible to more easily detect progressive defects that may be caused by an unstable state of other components or to more easily detect defects whose causes are unclear.

Figure 6:
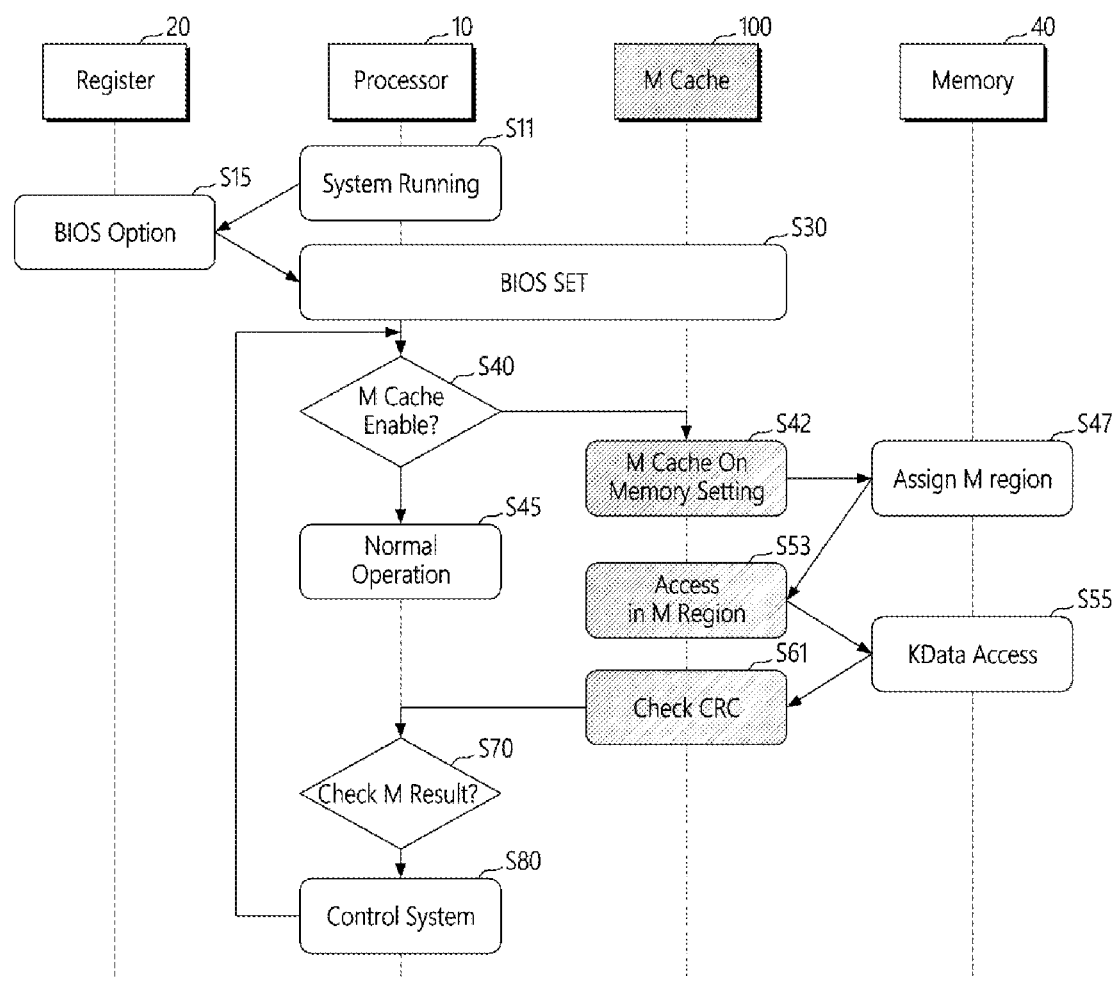
FIG. 6 is a diagram illustrating a method of operating an electronic device according to an embodiment of the inventive concept.

Hereinafter, methods of operating electronic devices according to embodiments of the inventive concept are illustrated in FIGS. 6 to 9. FIG. 6 is a diagram illustrating a method of operating an electronic device according to an embodiment of the inventive concept.

Referring to FIG. 6, when a system starts (S11), a processor reads system initial setup information from a register (S15). Each component of the electronic device may be set based on the system initial setup information (S30).

The system initial setup information may set an activation condition of the monitoring cache in the system while dividing a monitoring cache region, and the processor may activate the monitoring cache according to the activation condition (S40).

For example, in the activation condition, when a maximum bandwidth for the main memory is greater than or equal to a first reference value, the processor may activate the monitoring cache, and when the maximum bandwidth is less than or equal to a second reference value, the processor may deactivate the monitoring cache. Alternatively, the monitoring cache may be activated or deactivated according to a range of the number of banks of the main memory.

When the monitoring cache is activated, the processor sets the monitoring cache to a monitoring region on the main memory (S42). The setting for the monitoring region may mean that an address is allocated to each of the monitoring region and the normal region in the main memory (S47), that monitoring data KData is loaded from the monitoring cache 100 to the monitoring region 41 of the main memory, and that CRC code for the monitoring data is generated.

When the monitoring cache accesses the monitoring region under the control of the processor (S53), the CRC code is generated while the monitoring data stored in the monitoring region is loaded into the cache (S55), and the generated CRC code is compared with a verification value (S61).

Alternatively, when the monitoring cache is deactivated, the processor may perform a normal operation (S45).

After operation S45 or S61, the processor may check a CRC code verification result (S70) and adjust system environment information on the basis of the CRC code verification result (S80). For example, it is possible to adjust a bandwidth, operating clock frequency, or operating voltage for the main memory.

In embodiments of the inventive concept, the processor may perform a system control operation on the basis of the adjusted system environment information, and when the CRC code verification result for the monitoring data is changed periodically or changed according to the activation condition, the processor may restore the system environment information back to its original state to stabilize system performance.

Figure 7:
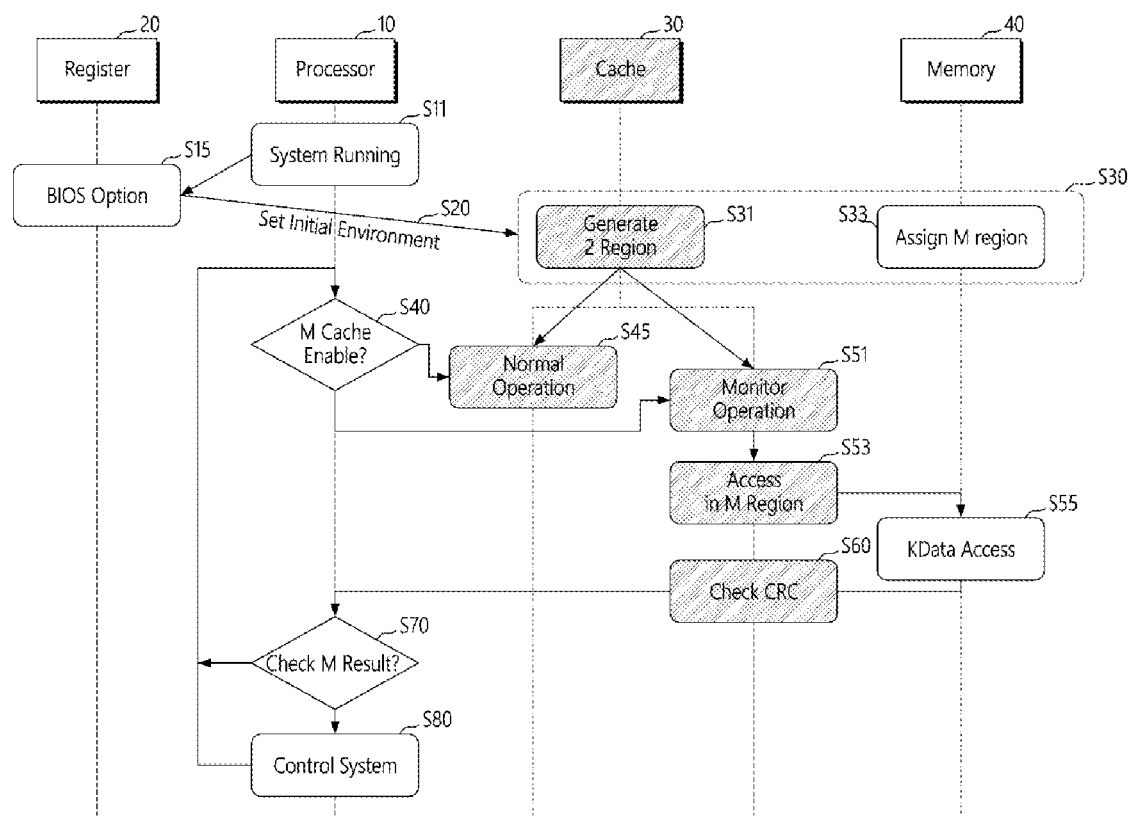
FIG. 7 is a diagram illustrating a method of operating an electronic device according to an embodiment of the inventive concept.

FIG. 7 is a diagram illustrating a method of operating an electronic device according to an embodiment of the inventive concept. Descriptions identical to that of FIG. 6 will be omitted.

Referring to FIG. 7, when a system starts (S11), a processor reads system initial setup information from a register (S15). Each component of the electronic device may be set based on the system initial setup information (S20 and S30).

For example, the setting may split or divide one cache 30 into a normal cache region and a monitoring cache region according to the system initial setup information (S31). Further, in a main memory, a monitoring region may be separately allocated using address information included in the system initial setup information (S33).

The system initial setup information may set an activation condition of a monitoring cache in the system while dividing the monitoring cache region, and the processor may activate the monitoring cache according to the activation condition (S40).

When the monitoring cache is activated, the processor may perform a monitoring operation (S51). For example, the monitoring operation may be an operation where monitoring data KData is loaded from the monitoring cache 100 into the monitoring region 41 of the main memory, and where CRC code for the monitoring data is generated.

When the monitoring cache accesses the monitoring region under the control of the processor (S53), the CRC code is generated while the monitoring data stored in the monitoring region is loaded into the cache (S55), and the generated CRC code is compared with a verification value (S60).

The processor may check a CRC code verification result (S70), and adjust system environment information in response to the CRC code verification result (S80).

Figure 8:
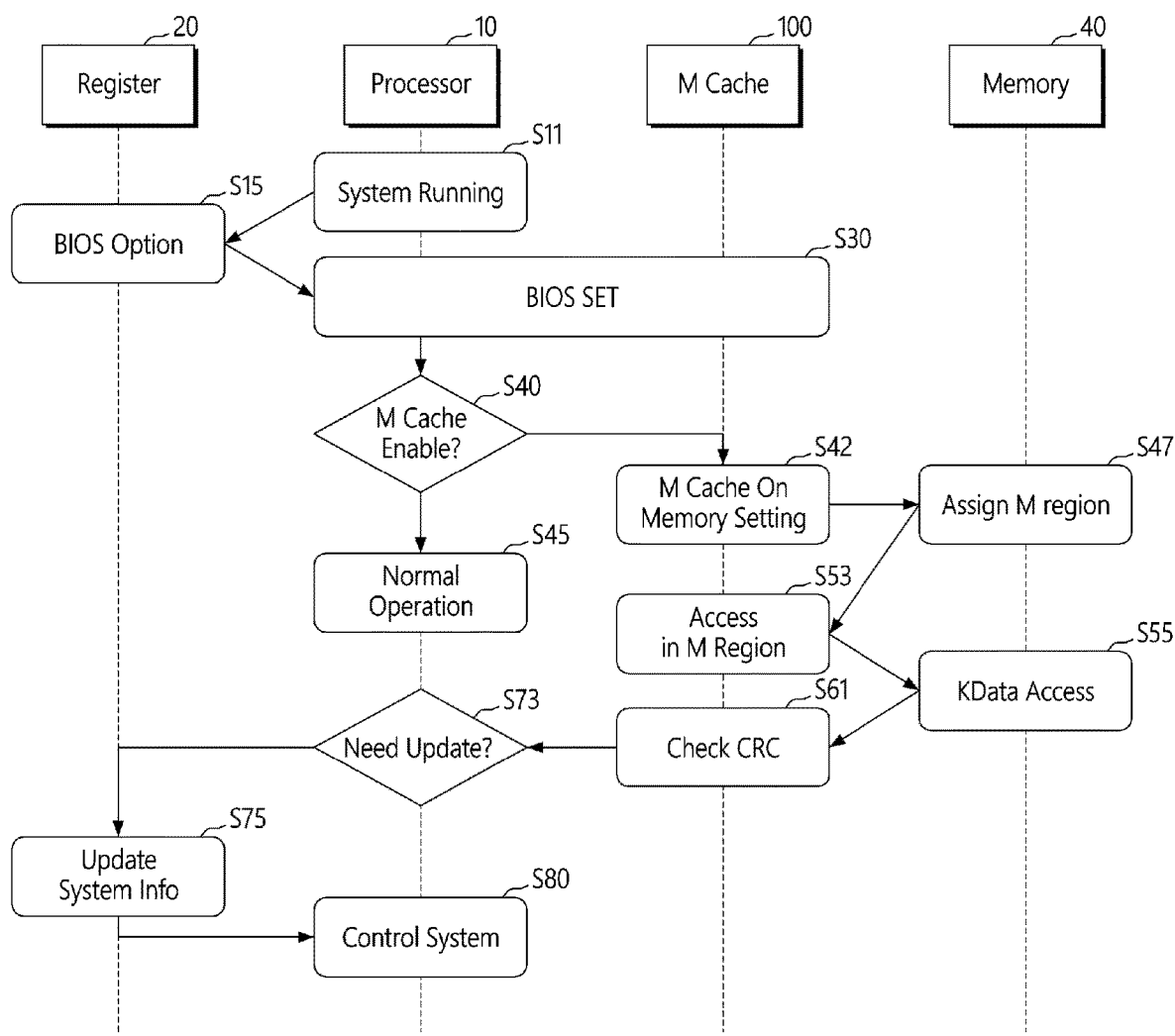
FIG. 8 is a diagram illustrating a method of operating an electronic device according to an embodiment of the inventive concept.

FIG. 8 is a diagram illustrating a method of operating an electronic device according to an embodiment of the inventive concept. Descriptions identical to that of FIG. 6 or 7 will be omitted.

Referring to FIG. 8, unlike the embodiments of FIGS. 6 and 7, a monitoring cache itself generates CRC code for monitoring data KData, verifies the generated CRC code in comparison with a pre-stored verification value, and transmits a verification result to the processor 10.

When it is determined that system environment information stored in the register 20 needs to be updated based on the verification result (S73), the processor 10 transmits a register bit, for the system environment information that needs to be updated, to the register.

The register 20 receives the register bit from the processor 10 to newly update the existing system environment information (S75), and the processor 10 performs a system control operation on the basis of the updated system environment information (S80).

Figure 9:
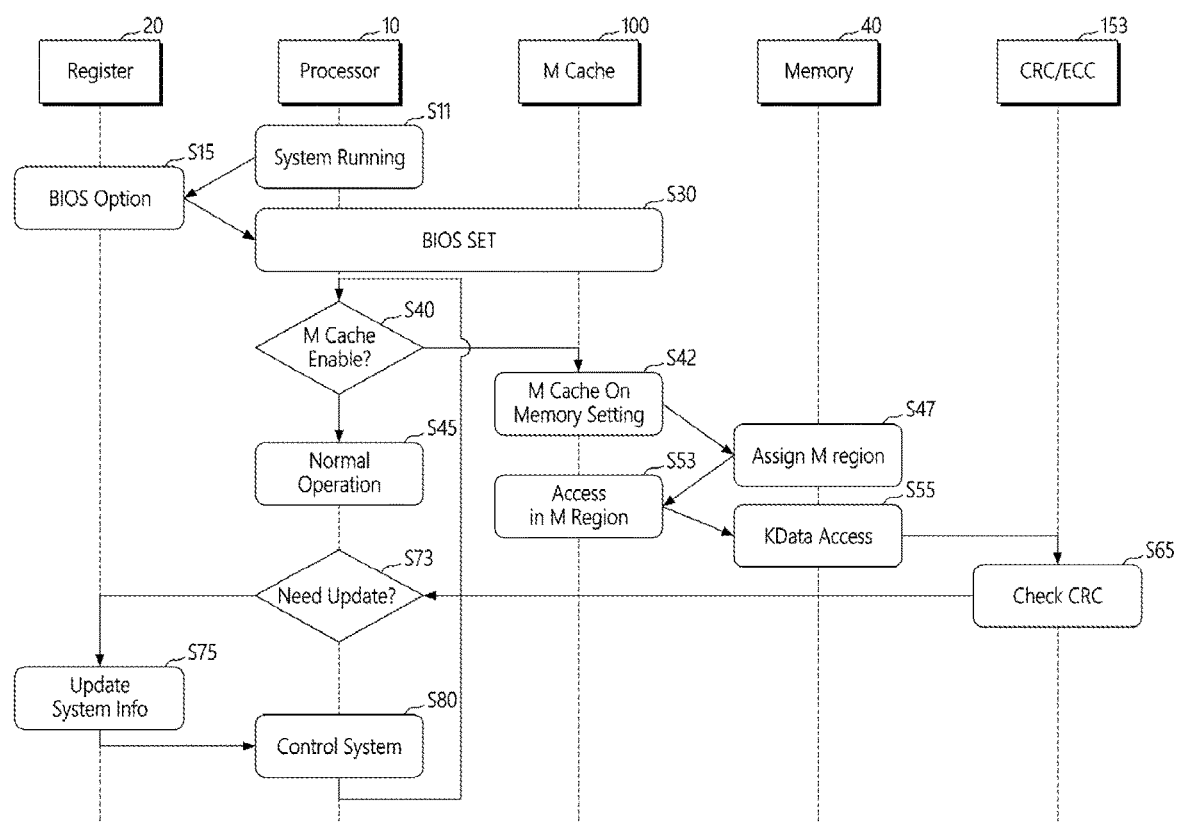
FIG. 9 is a diagram illustrating a method of operating an electronic device according to an embodiment of the inventive concept.

FIG. 9 is a diagram illustrating a method of operating an electronic device according to an embodiment of the inventive concept.

Referring to FIG. 9, unlike the embodiment of FIG. 8, CRC code generation and verification for monitoring data KData may be performed by the CRC module 153 (e.g., as shown in FIG. 3) separately implemented in the electronic device 1 (S65). In this case, since operations S73, S75, and S80 performed after obtaining the CRC code verification result are identical to those in the embodiment of FIG. 8, descriptions thereof will be omitted.

Figure 10:
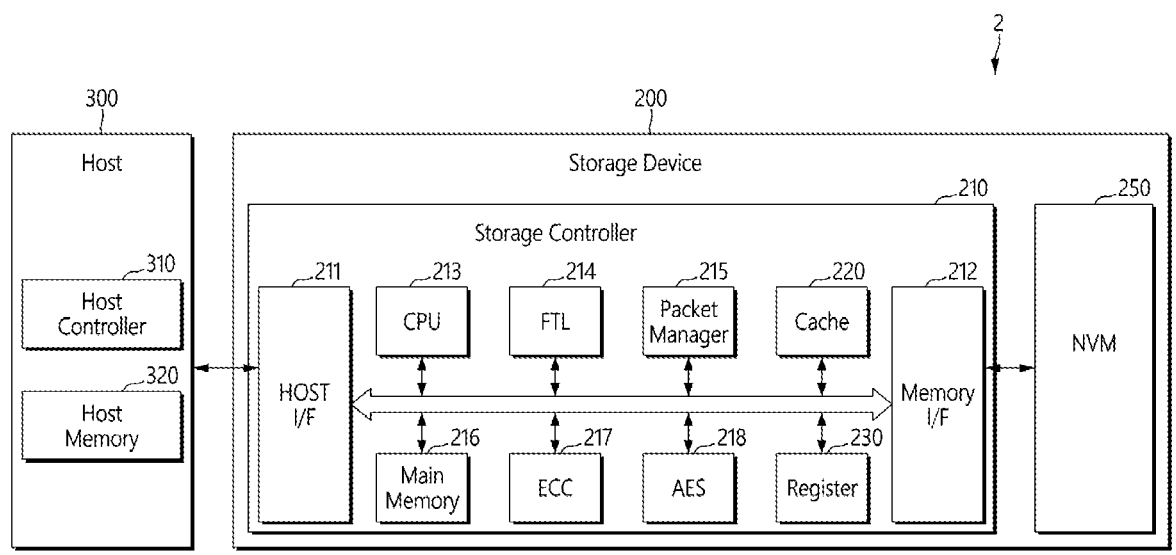
FIG. 10 is a block diagram illustrating a host-storage system according to an embodiment of the inventive concept.

FIG. 10 is a block diagram illustrating a host-storage system according to an embodiment of the inventive concept.

A host-storage system 2 may include a host 300 and a storage device 200. Further, the storage device 200 may include a storage controller 210 and an NVM 250. Further, in embodiments of the inventive concept, the host 300 may include a host controller 310 and a host memory 320. The host memory 320 may function as a buffer memory for temporarily storing data to be transmitted to the storage device 200 or data transmitted from the storage device 200.

The storage device 200 may include storage media for storing data in response to a request from the host 300. For example, the storage device 200 may include at least one of a solid state drive (SSD), an embedded memory, or a removable external memory. When the storage device 200 includes a SSD, the storage device 200 may be a device which is compliant with an NVM Express (NVMe) standard. When the storage device 200 includes an embedded memory or an external memory, the storage device 200 may be a device which is compliant with a universal flash storage (UFS) or embedded multi-media card (eMMC) standard. Each of the host 300 and the storage device 200 may generate a packet according to the adopted standard protocol and transmit the generated packet.

When the NVM 250 of the storage device 200 includes a flash memory, the flash memory may include a two-dimensional (2D) NAND memory array or a three-dimensional (3D) (or vertical) NAND (VNAND) memory array. As another example, the storage device 200 may include various types of other NVMs. For example, a magnetic RAM (MRAM), a spin-transfer torque MRAM, a conductive bridging RAM (CBRAM), a ferroelectric RAM (FeRAM), a PRAM, a RRAM, or various types of other memories may be applied as the storage device 200.

In embodiments of the inventive concept, the host controller 310 and the host memory 320 may be implemented as separate semiconductor chips. Alternatively, in embodiments of the inventive concept, the host controller 310 and the host memory 320 may be integrated into one semiconductor chip. For example, the host controller 310 may be any one of a plurality of modules provided in an application processor, and the application processor may be implemented as a system-on-chip (SoC). Further, the host memory 320 may be an embedded memory provided in the application processor, or may be an NVM or memory module disposed outside the application processor.

The host controller 310 may manage an operation of storing data (e.g., write data) of a buffer region in the NVM 250 or storing data (e.g., read data) of the NVM 250 in the buffer region.

The storage controller 210 may include a host interface 211, a memory interface 212, and a central processing unit (CPU) 213. Further, the storage controller 210 may further include a flash translation layer (FTL) 214, a packet manager 215, a main memory 216, an ECC engine 217, an advanced encryption standard (AES) engine 218, a cache 220, and a register 230.

The storage controller 210 may further include a working memory in which the FTL 214 is loaded, and the CPU 213 executes the FTL to control data write and read operations for the NVM.

The host interface 211 may transmit or receive packets to or from the host 300. Packets transmitted from the host 300 to the host interface 211 may include commands or data to be written to the NVM 250, and packets transmitted from the host interface 211 to the host 300 may include responses with respect to the commands or data read from the NVM 250.

The memory interface 212 may transmit the data to be written to the NVM 250 or may receive the read data from the NVM 250. The memory interface 212 may be implemented to be compliant with a standard convention such as Toggle or the Open NAND Flash Interface Working Group (ONFI).

The FTL 214 may perform various functions such as address mapping, wear-leveling, and garbage collection. Address mapping is an operation of converting a logical address received from the host into a physical address used to actually store data in the NVM 250. Wear-leveling is a technique in which excessive degradation of a specific block is prevented by allowing blocks in the NVM 250 to be uniformly used, and, as an example, may be implemented using a firmware technique for balancing erase counts of physical blocks. Garbage collection is a technique in which usable capacity is secured in the NVM 250 by copying valid data of a block to a new block and then erasing the existing block.

The packet manager 215 may generate a packet according to a protocol of an interface negotiated with the host 300, or may parse various types of information from the packet received from the host 300. Further, the main memory 216 may temporarily store the data to be written to the NVM 250 or the data read from the NVM 250. The main memory 216 may be provided in the storage controller 210, but may alternatively be disposed outside the storage controller 210.

The ECC engine 217 may perform an error detection and correction function for the write data written to or the read data read from the NVM 250. For example, the ECC engine 217 may generate parity bits with respect to write data to be written to the NVM 250, and the parity bits generated as described above may be stored in the NVM 250 together with the write data. When the data is read from the NVM 250, the ECC engine 217 may correct an error of the read data using the parity bits, which are read from the NVM 250 together with the read data, and output the read data with the error corrected.

The AES engine 218 may perform at least one of an encryption operation and a decryption operation for data input to the storage controller 210 using a symmetric-key algorithm.

The cache 220 may be implemented as the cache 30 described with reference to FIGS. 1 to 9, and the register 230 may also be implemented as the register 20 described with reference to FIGS. 1 to 9.

Figure 11:
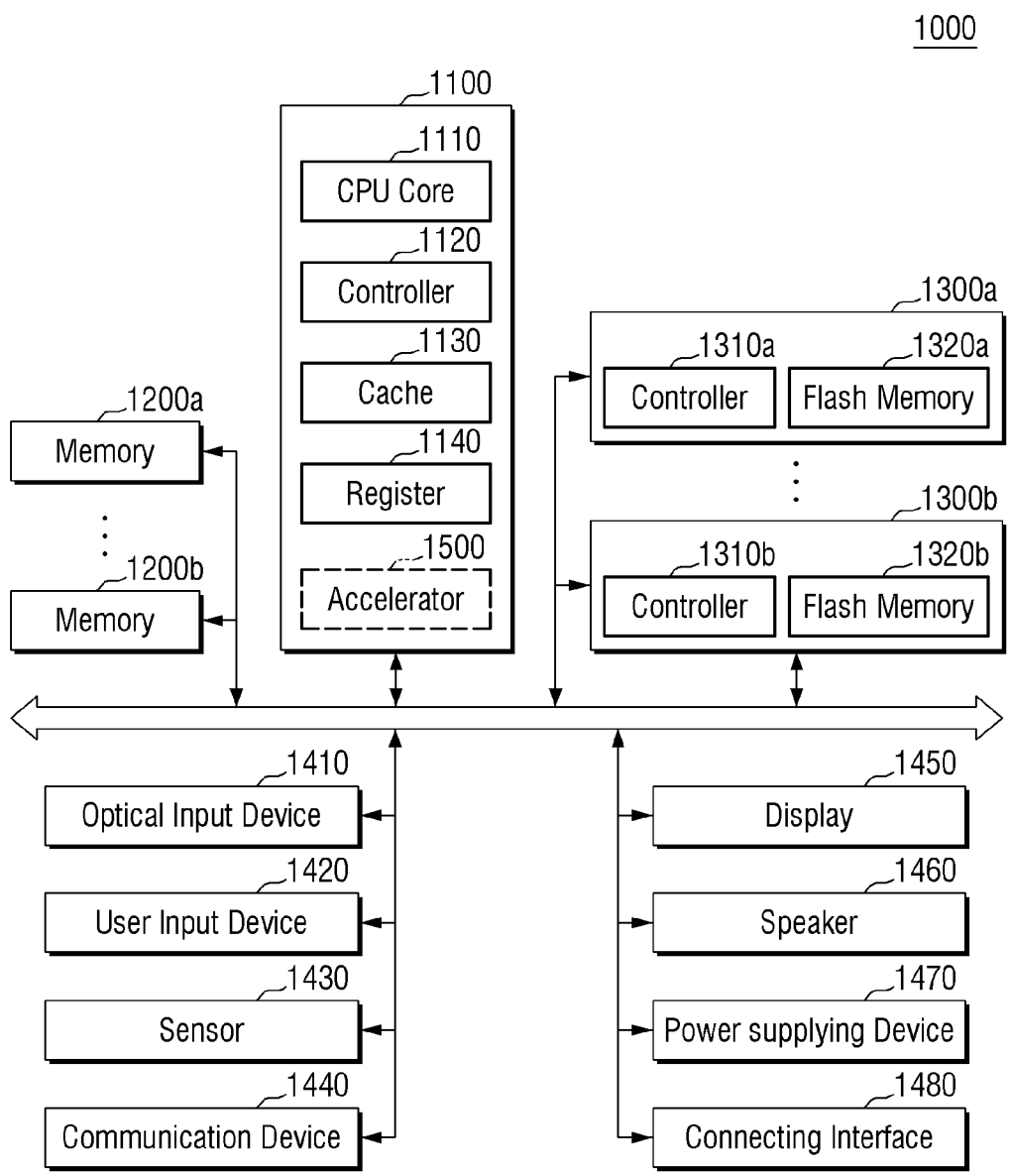
FIG. 11 is a diagram illustrating a system to which the electronic device of FIG. 1 according to an embodiment of the inventive concept is applied.

FIG. 11 is a diagram illustrating a system to which the electronic device of FIG. 1 according to an embodiment of the inventive concept is applied.

A system 1000 of FIG. 11 may basically be a mobile system, such as a mobile phone, a smartphone, a tablet PC, a wearable device, a healthcare device, or an IoT device. However, the system 1000 of FIG. 11 is not necessarily limited to the mobile system, and may be a PC, a laptop computer, a server, a media player, or an automotive device such as a navigation system.

Referring to FIG. 11, the system 1000 may include a main processor 1100, memories 1200a and 1200b, and storage devices 1300a and 1300b and, additionally, may include at least one of an image capturing device or optical input device 1410, a user input device 1420, a sensor 1430, a communication device 1440, a display 1450, a speaker 1460, a power supplying device 1470, and a connecting interface 1480.

The main processor 1100 may control the overall operation of the system 1000, and for example, control operations of other components constituting the system 1000. The main processor 1100 may be implemented as a general-purpose processor, a dedicated processor, or an application processor.

The main processor 1100 may include one or more CPU cores 1110, and may further include a controller 1120 for controlling the memories 1200a and 1200b and/or the storage devices 1300a and 1300b. In an embodiment of the inventive concept, the main processor 1100 may further include an accelerator block 1500, which is a dedicated circuit for a high-speed data operation such as an artificial intelligence (AI) data operation. The accelerator block 1500 may include a graphics processing unit (GPU), a neural processing unit (NPU), and/or a data processing unit (DPU), and may be implemented as a separate chip physically independent from other components of the main processor 1100.

The main processor 1100 may also include a cache 1130 and a register 1140. The cache 1130 may be implemented as the cache 30 described with reference to FIGS. 1 to 9, and the register 1140 may also be implemented as the register 20 described with reference to FIGS. 1 to 9.

The memories 1200a and 1200b may be used as main memories of the system 1000, and may include a volatile memory such as a SRAM and/or a DRAM, but may include an NVM such as a flash memory, a PRAM, and/or a RRAM. The memories 1200a and 1200b may be implemented in one package together with the main processor 1100.

The storage devices 1300a and 1300b may function as non-volatile (NV) storage devices that store data regardless of whether power is supplied, and may have a relatively larger storage capacity than the memories 1200a and 1200b. The storage devices 1300a and 1300b may include storage controllers 1310a and 1310b and NV storages 1320a and 1320b that store data under the control of the storage controllers 1310a and 1310b. The NV storages 1320a and 1320b may include VNAND flash memories having a 2D or 3D structure, but may include other types of NVMs such as a PRAM and/or a RRAM.

The storage devices 1300a and 1300b may be included in the system 1000 to be physically separated from the main processor 1100, or may be implemented in one package together with the main processor 1100. Further, the storage devices 1300a and 1300b may have the same shape as a memory card, and thus may be detachably coupled to other components of the system 1000 through an interface such as the connecting interface 1480 to be described below. The storage devices 1300a and 1300b may be devices to which a standard convention such as a UFS standard is applied, but the inventive concept is not limited thereto.

The image capturing device 1410 may capture a still image or a video and include a camera, a camcorder, and/or a webcam.

The user input device 1420 may receive various types of data input by a user of the system 1000, and may include a touch pad, a keypad, a keyboard, a mouse, and/or a microphone.

The sensor 1430 may detect various types of physical quantities that may be obtained from an outside of the system 1000, and convert the detected physical quantities into electrical signals. The sensor 1430 may include a temperature sensor, a pressure sensor, an illuminance sensor, a position sensor, an acceleration sensor, a biosensor, and/or a gyroscope.

The communication device 1440 may perform transmission or reception of signals between the system 1000 and other devices outside the system 1000 according to various protocols. The communication device 1440 may be implemented by including an antenna, a transceiver, and/or a modem.

The display 1450 and the speaker 1460 may function as output devices that output visual information and audio information, respectively, to the user of the system 1000.

The power supplying device 1470 may appropriately convert power, which is supplied from a battery embedded in the system 1000 and/or from an external power source, and supply the converted power to each of the components of the system 1000.

The connecting interface 1480 may provide a connection between the system 1000 and an external device, which is connected to the system 1000, to transmit or receive data to or from the system 1000. The connecting interface 1480 may be implemented using various interface methods, such as Advanced Technology Attachment (ATA), Serial ATA (SATA), external SATA (e-SATA), Small Computer Small Interface (SCSI), Serial Attached SCSI (SAS), Peripheral Component Interconnect (PCI), PCI express (PCIe), NVMe, IEEE 1394, Universal Serial Bus (USB), a secure digital (SD) card, a multi-media card (MMC), an eMMC, a UFS, an embedded Universal Flash Storage (eUFS), a compact flash (CF) card interface, or the like.

Figure 12:
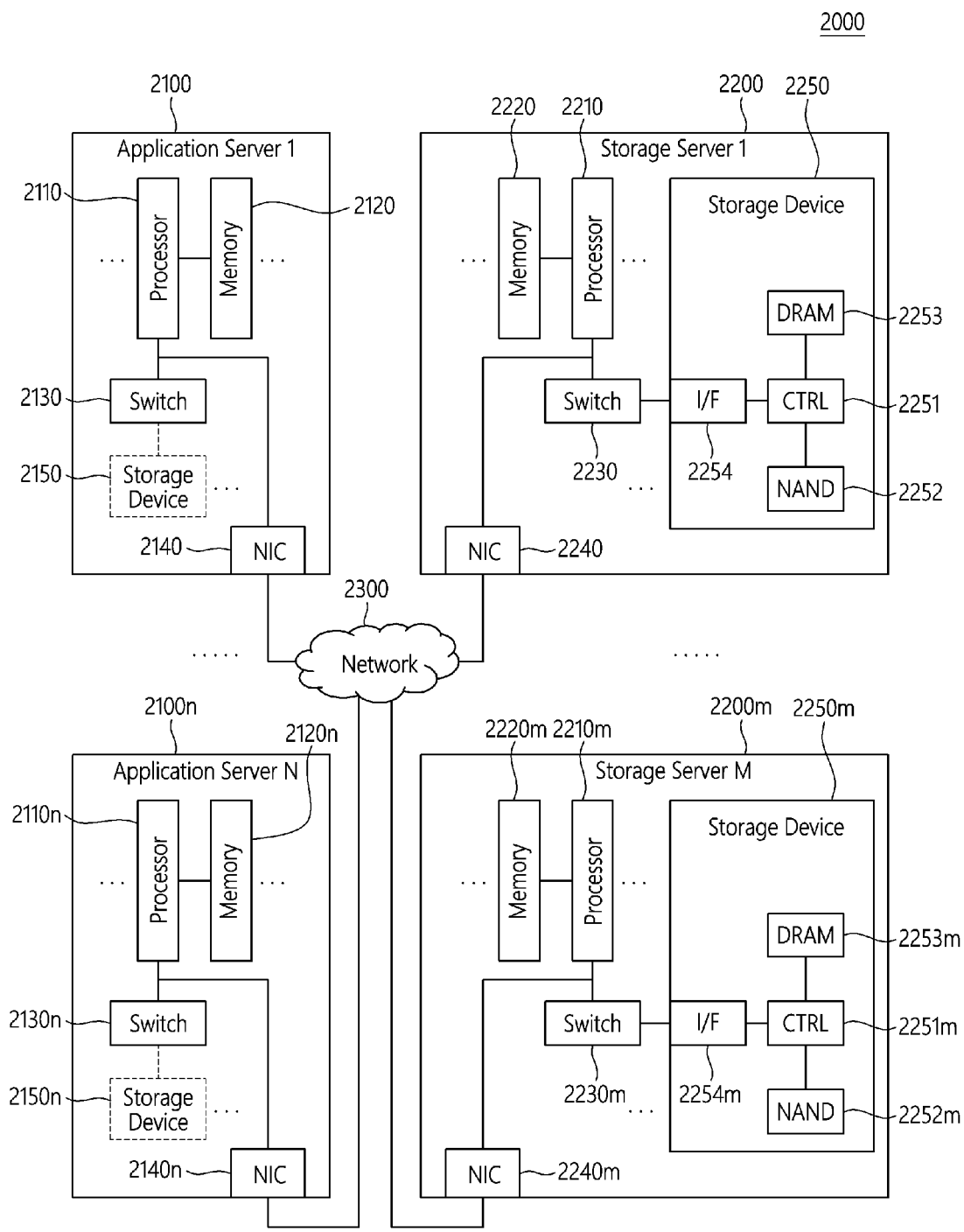
FIG. 12 is a diagram illustrating a data center to which an electronic device according to an embodiment of the inventive concept is applied.

FIG. 12 is a diagram illustrating a data center to which an electronic device according to an embodiment of the inventive concept is applied.

Referring to FIG. 12, a data center 2000 is a facility that collects various types of data and provides services, and may be referred to as a data storage center. The data center 2000 may be a system for operating a search engine and a database, or may be a computing system used by a company such as a bank or a government agency. The data center 2000 may include application servers 2100 to 2100n and storage servers 2200 to 2200m. The number of application servers 2100 to 2100n and the number of storage servers 2200 to 2200m may be selected differently according to embodiments of the inventive concept, and the number of application servers 2100 to 2100n may be different from the number of storage servers 2200 to 2200m.

The application server 2100 may include at least one processor 2110 and at least one memory 2120, and the storage server 2200 may include at least one processor 2210 and at least one memory 2220. For example, in the storage server 2200, the processor 2210 may control the overall operation of the storage server 2200 and may access the memory 2220 to execute commands and/or data loaded in the memory 2220. The memory 2220 may include a DDR SDRAM, a HBM, a HMC, a DIMM, an Optane™ DIMM, or an NVDIMM. The number of processors 2210 and the number of memories 2220 included in the storage server 2200 may be selected differently according to embodiments of the inventive concept.

In an embodiment of the inventive concept, the processor 2210 and the memory 2220 may provide a processor-memory pair. In an embodiment of the inventive concept, the number of processors 2210 may be different from the number of memories 2220. The processor 2210 may include a single-core processor or a multiple-core processor. The description of the storage server 2200 may be similarly applied to the application server 2100. In embodiments of the inventive concept, the application server 2100 may not include a storage device 2150. The storage server 2200 may include at least one storage device 2250. The number of storage devices 2250 included in the storage server 2200 may be selected differently according to embodiments of the inventive concept.

The storage assembly described above may be mounted on or detached from the storage server 2200, which is a host, in the form of one storage device 2250.

The application servers 2100 to 2100n may communicate with the storage servers 2200 to 2200m through a network 2300. The network 2300 may be implemented using Fibre Channel (FC) or Ethernet. In this case, an optical switch, which is a medium used for relatively high-speed data transmission and provides high performance/high availability, may be used as FC. The storage servers 2200 to 2200m may be provided as file storages, block storages, or object storages according to a method of accessing the network 2300.

In an embodiment of the inventive concept, the network 2300 may be a storage-dedicated network such as a storage area network (SAN). For example, the SAN may include an FC-SAN that uses an FC network and is implemented according to a FC Protocol (FCP). As another example, the SAN may include an IP-SAN that uses a Transmission Control Protocol/Internet protocol (TCP/IP) network and is implemented according to an Internet SCSI (iSCSI) (or SCSI over TCP/IP) protocol. As still another example, the network 2300 may include a general network such as a TCP/IP network. For example, the network 2300 may be implemented according to protocols such as FC over Ethernet (FCoE), Network Attached Storage (NAS), NVMe over Fabrics (NVMe-oF), or the like.

Hereinafter, the application server 2100 and the storage server 2200 will be mainly described. The description of the application server 2100 may be applied to another application server 2100n, and the description of the storage server 2200 may be applied to another storage server 2200m.

The application server 2100 may store data requested by a user or a client to be stored, in one of the storage servers 2200 to 2200m via the network 2300. In addition, the application server 2100 may obtain data requested by the user or the client to be read from one of the storage servers 2200 to 2200m via the network 2300. For example, the application server 2100 may be implemented as a web server or a database management system (DBMS).

The application server 2100 may access a memory 2120n or a storage device 2150n included in another application server 2100n through the network 2300, or may access the memories 2220 to 2220m or the storage devices 2250 to 2250m included in the storage servers 2200 to 2200m through the network 2300. Accordingly, the application server 2100 may perform various operations on the data stored in the application servers 2100 to 2100n and/or the storage servers 2200 to 2200m. For example, the application server 2100 may execute a command for moving or copying the data between the application servers 2100 to 2100n and/or the storage servers 2200 to 2200m. In this case, the data may be moved from the storage devices 2250 to 2250m of the storage servers 2200 to 2200m to the memories 2120 to 2120n of the application servers 2100 to 2100n through the memories 2220 to 2220m of the storage servers 2200 to 2200m, or may be directly moved from the storage devices 2250 to 2250m of the storage servers 2200 to 2200m to the memories 2120 to 2120n of the application servers 2100 to 2100n. The data moved through the network 2300 may include data encrypted for security or privacy.

For example, in the storage server 2200, an interface 2254 may provide a physical connection between the processor 2210 and a controller 2251 and a physical connection between a network interface controller (NIC) 2240 and the controller 2251. For example, the interface 2254 may be implemented using a direct attached storage (DAS) method in which the storage device 2250 is directly connected using a dedicated cable. In addition, for example, the interface 2254 may be implemented using various interface methods, such as ATA, SATA, e-SATA, SCSI, SAS, PCI, PCIe, NVMe, IEEE 1394, USB, a SD card, a MMC, an eMMC, a UFS, an eUFS, a CF card interface, or the like.

The storage server 2200 may further include a switch 2230 and the NIC 2240. The switch 2230 may selectively connect the processor 2210 to the storage device 2250, or may selectively connect the NIC 2240 to the storage device 2250 under the control of the processor 2210.

In an embodiment of the inventive concept, the NIC 2240 may include a network interface card, a network adaptor, or the like. The NIC 2240 may be connected to the network 2300 through a wired interface, a wireless interface, a Bluetooth interface, an optical interface, or the like. The NIC 2240 may include an internal memory, a digital signal processor (DSP), a host bus interface, or the like, and may be connected to the processor 2210 and/or the switch 2230 through the host bus interface. The host bus interface may be implemented as one of the examples of the interface 2254 described above. In an embodiment of the inventive concept, the NIC 2240 may be integrated with at least one of the processor 2210, the switch 2230, or the storage device 2250.

In the storage servers 2200 to 2200m or the application servers 2100 to 2100n, the corresponding processor may transmit commands to the storage devices 2150 to 2150n and 2250 to 2250m or the memories 2120 to 2120n and 2220 to 2220m to program or read data. In this case, the data may include data with an error corrected through an ECC engine. The data is data that is processed by data bus inversion (DBI) or data masking (DM) and may include CRC information. The data may include data encrypted for security or privacy.

The storage devices 2150 to 2150n and 2250 to 2250m may transmit control signals and command/address signals to NAND flash memory devices 2252 to 2252m in response to read commands received from a processor. Accordingly, when data is read from the NAND flash memory devices 2252 to 2252m, a read enable (RE) signal is input as a data output control signal to output the data to a DQ bus. A data strobe signal (DQS) may be generated using the RE signal. The command and the address signal may be latched in a page buffer according to a rising edge or falling edge of a write enable (WE) signal.

The controller 2251 may control the overall operation of the storage device 2250. In an embodiment of the inventive concept, the controller 2251 may include a SRAM. The controller 2251 may write data to the NAND flash memory device 2252 in response to a write command, or may read data from the NAND flash memory device 2252 in response to a read command. For example, the write command and/or the read command may be provided from the processor 2210 in the storage server 2200, from the processor 2210m in another storage server 2200m, or from the processors 2110 and 2110n in the application servers 2100 and 2100n. A DRAM 2253 may temporarily store (buffer) data to be written to the NAND flash memory device 2252 or data read from the NAND flash memory device 2252. Further, the DRAM 2253 may store metadata. Here, the metadata is user data or data generated by the controller 2251 to manage the NAND flash memory device 2252. The storage device 2250 may include a secure element (SE) encrypted for security or privacy.

Each of the application servers 2100 to 2100n have the same or a similar configuration as the application server 2100 described above. Each of the storage servers 2200 to 2200m may have the same or a similar configuration as the storage server 2200 described above.

While the inventive concept has been shown and described with reference to embodiments thereof, it will be apparent to those of ordinary skill in the art that various changes in form and details may be made thereto without departing from the spirit and scope of the inventive concept as set forth by the appended claims.

What is claimed is:

1. An electronic device comprising:
a processor configured to control a system;
a main memory including a first region configured to store normal data according to a normal operation and a second region configured to store monitoring data, wherein the monitoring data is a known data pattern having a high possibility of causing a defect, and the monitoring data is pre-stored in the second region;
a first cache configured to be activated in response to a monitoring enable signal of the processor and to access the second region; and
a second cache configured to load the normal data according to the normal operation of the processor,
wherein the known data pattern of the monitoring data is set such that a cell margin and an input and output margin in which characteristics of the main memory are reflected are less than a predetermined threshold.

2. The electronic device of claim 1, wherein, when the system starts, the electronic device divides the main memory into the first region and the second region and allocates addresses thereto.

3. The electronic device of claim 1, wherein the electronic device verifies cyclic redundancy check (CRC) code for the monitoring data.

4. The electronic device of claim 3, wherein the processor adjusts system environment information in response to a CRC code verification result, and
wherein, in the first cache, the CRC code for the monitoring data written to or read from the second region is generated and verified.

5. The electronic device of claim 3, wherein, when the system starts, the monitoring enable signal is periodically enabled according to basic input/output system (BIOS) setting or is enabled under a preset activation condition.

6. The electronic device of claim 1, further comprising a register configured to store an activation condition of the monitoring enable signal,
wherein, when the system starts, the processor loads the activation condition from the register to set the system.

7. The electronic device of claim 6, wherein the activation condition includes at least one of a temperature of the processor or the main memory, input and output bandwidths for the main memory, the number of bank operations in the main memory, or a running time of the system.

8. The electronic device of claim 7, wherein the processor adjusts system environment information in response to a comparison result of CRC code for the monitoring data, and updates the adjusted system environment information stored in the register.

9. An automotive device comprising:
a register configured to store system initial setup information and system environment information;
a processor configured to perform system control and arithmetic operations on the basis of the system initial setup information and the system environment information;
a main memory including a first region configured to store normal data based on the arithmetic operations of the processor and a second region configured to store preset monitoring data,
wherein the monitoring data is a known data pattern having a high possibility of causing a defect;
a first cache configured to access the main memory and perform an operation to access the monitoring data; and
a second cache configured to access the main memory and perform an operation to access the normal data,
wherein the automotive device verifies cyclic redundancy check (CRC) code for the monitoring data to monitor a system environment, and
wherein the known data pattern of the monitoring data is set such that a cell margin and an input and output margin in which characteristics of the main memory are reflected are less than a predetermined threshold.

10. The automotive device of claim 9, wherein the system initial setup information includes an activation condition of the first cache and address allocation information for dividing the main memory into the first region and the second region.

11. The automotive device of claim 10, wherein the activation condition includes at least one of a temperature of the processor or the main memory, input and output bandwidths for the main memory, the number of bank operations in the main memory, or a running time of a system.

12. The automotive device of claim 9, wherein, in the first cache, the CRC code is generated while reading or writing the monitoring data from or to the second region, the generated CRC code is verified during a verification, and a result of the verification is transmitted to the processor.

13. The automotive device of claim 9, further comprising a CRC module configured to generate and verify the CRC code for the accessed normal data and monitoring data of the main memory,
wherein the CRC module transmits a CRC code verification result for the monitoring data to the processor.

14. The automotive device of claim 13, wherein the processor adjusts the system environment information in response to the CRC code verification result and updates the adjusted system environment information stored in the register.

15. A data center comprising a storage server, wherein the storage server includes:
a register configured to store system initial setup information and system environment information;
a processor configured to control an operation of the storage server on the basis of the system initial setup information and the system environment information;
a main memory including a first region configured to store normal data based on arithmetic operations of the processor and a second region configured to store preset monitoring data, wherein the monitoring data is a known data pattern having a high possibility of causing a defect; and
a monitoring cache configured to access the main memory and perform an operation for accessing the monitoring data,
wherein the known data pattern of the monitoring data is set such that a cell margin and an input and output margin in which characteristics of the main memory are reflected are less than a predetermined threshold.

16. The data center of claim 15, wherein the monitoring cache is enabled periodically on the basis of the system initial setup information or enabled according to an activation condition.

17. The data center of claim 15, wherein the processor updates the system environment information stored in the register on the basis of cyclic redundancy check (CRC) code for the monitoring data.

18. The data center of claim 17, wherein the processor controls operation of the storage server on the basis of the updated system environment information.

19. The data center of claim 15, wherein the system initial setup information includes an activation condition and address allocation information for dividing the main memory into the first region and the second region.

20. The data center of claim 15, wherein the monitoring cache includes the monitoring data, and the monitoring data is written from the monitoring cache to the second region or is read from the second region to the monitoring cache on the basis of the system initial setup information.

\* \* \* \* \*